Jan. 22, 1935.   C. B. SMITH   1,988,579
GLASSWARE FORMING MACHINE
Filed April 4, 1932   2 Sheets-Sheet 2
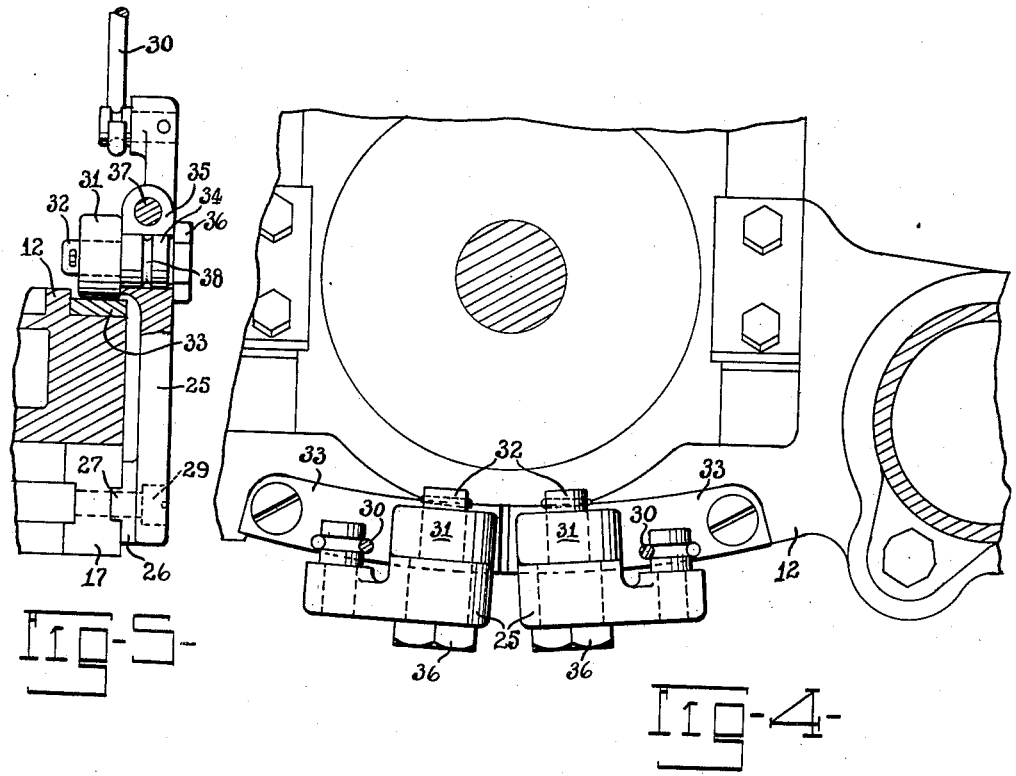
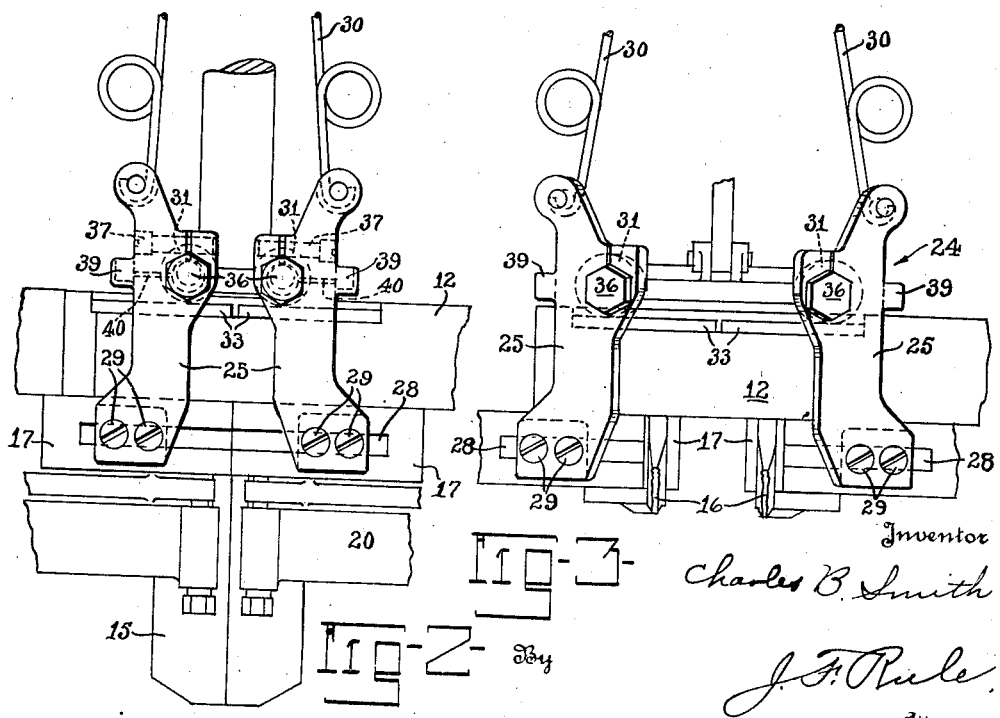

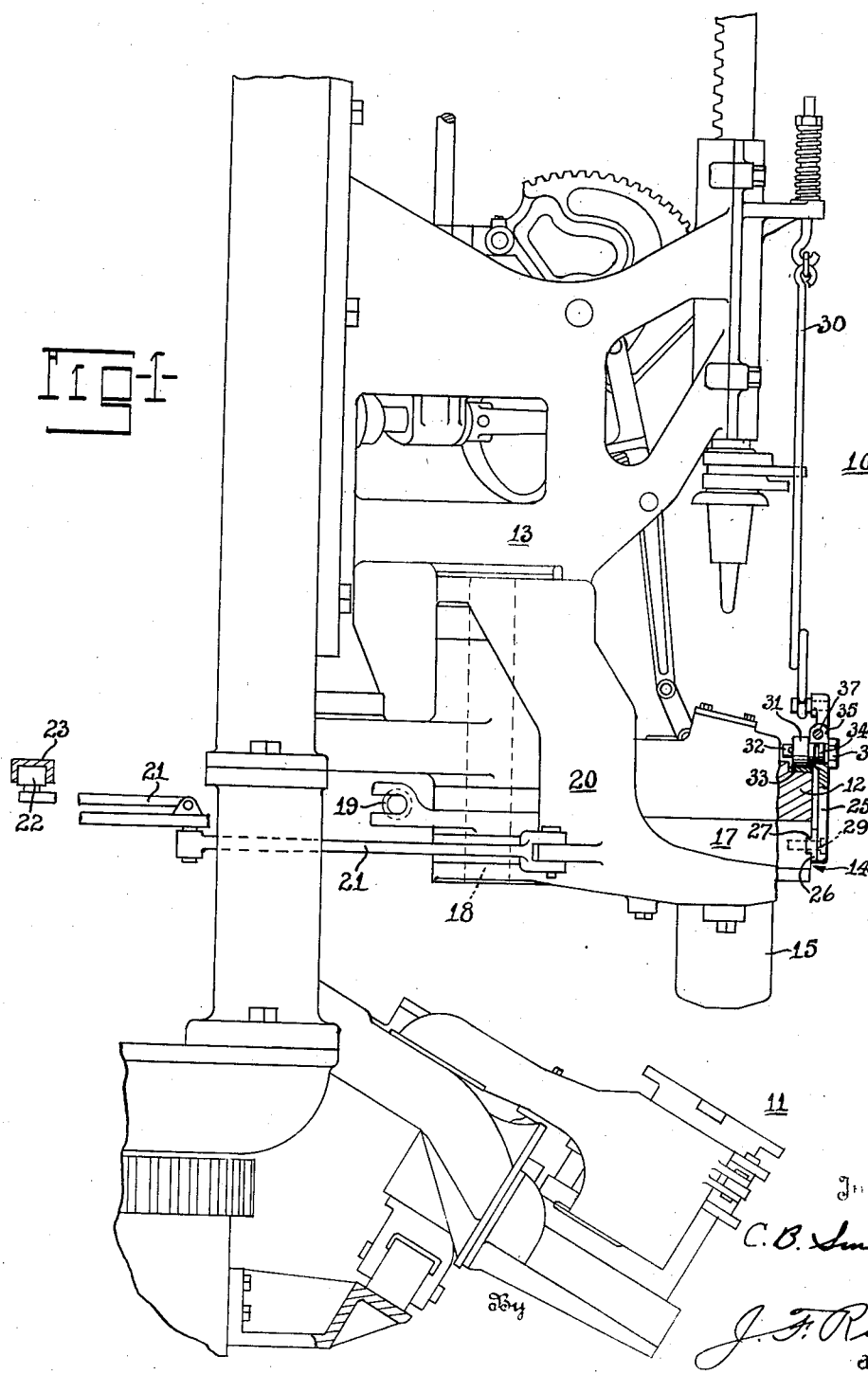

Patented Jan. 22, 1935

1,988,579

UNITED STATES PATENT OFFICE 1,988,579

GLASSWARE FORMING MACHINE

Charles B. Smith, Marion, Ind., assignor to Owens-Illinois Glass Company, a corporation of Ohio Application April 4, 1932, Serial No. 603,071

13 Claims. (Cl. 49—5)

The present invention relates to improvements in glassware forming machines and more particularly to that type of machine in which mold charges are gathered by suction through downwardly facing charging openings provided in the blank molds. In machines of the above character it is customary to employ an annular series of mold groups or heads, each including a blank forming unit which is mounted for up and down movement as part of the usual mold charging operation. Each blank forming unit includes a relatively fixed dipping head, a partible neck mold immediately below said dipping head, and a partible body blank mold arranged below and adapted to cooperate with the neck mold in the usual manner. These molds are pivoted to a common vertical hinge pin about which they swing during the usual opening and closing movements. Satisfactory operation and consequent production of quality glassware demands that the neck molds occupy a definite constant position with respect to the dipping head as well as the body blank mold. In the event of excessive wear of portions of the hinge pin, or collars which fit over the hinge pin and are connected through arms to the neck molds, or inaccurate fitting of these parts in the initial installation, there may well be a tendency on the part of the neck mold to sag or pull away from the dipping head. Frequently, the neck molds will be not only spaced too great a distance from the dipping head but in addition be out of parallel alignment with the said dipping head. This results in leakage of vacuum and air under pressure. Consequently, full charges of glass cannot be gathered and in addition, unsatisfactory final expansion of the articles results.

An object of the present invention is the provision of a novel means for obtaining and maintaining a proper setting of the neck molds with respect to the corresponding dipping heads.

A further object is the provision of means of the above character which may be adjusted with ease and without an unnecessary loss of production time.

Other objects will be in part apparent and in part pointed out hereinafter.

In the drawings:

Fig. 1 is a sectional elevational view of a mold group embodying the present invention.

Fig. 2 is a fragmentary front elevational view thereof showing the molds closed.

Fig. 3 is a view similar to Fig. 2 showing the neck molds open.

Fig. 4 is a sectional plan view of the parts positioned as in Fig. 2.

Fig. 5 is a side elevational view with parts in section showing one of the neck mold supporting devices.

The machine with which the present invention is illustrated is of conventional form and includes a blank mold unit 10 and a finishing mold unit 11 disposed below and for cooperation with said blank mold unit. These units constitute a complete head or group of which there may be an annular series supported upon a mold carriage for continuous or intermittent rotation about a vertical axis. These mold groups may well be of conventional form in every respect and embody structure such as illustrated and described in LaFrance Patent 1,185,687, dated June 6, 1916, to which reference may be had for details of construction.

The blank mold group 10 includes a dipping head 12 at the lower outer end of the dipping frame 13. A neck mold 14 is arranged directly beneath the dipping head and a body blank mold 15 is positioned below the neck mold for cooperation therewith. The neck mold 14 consists of two sections 16 mounted in a neck mold carrier 17. This carrier is of the usual construction such as disclosed in the above identified patent and includes a pair of arms pivoted to a vertical hinge pin 18. By means of a coil spring 19 these arms are normally and yieldingly held in position to close the neck mold. The body blank mold 15 consists of two sections mounted upon a pair of arms 20 pivoted to the hinge pin 18 which supports the neck mold. These arms are connected through links 21 to a cam roll 22 which runs in a cam 23, said cam designed to alternately open and close the body blank mold at regular time intervals. Opening of the body blank mold beyond a predetermined point will bring the arms 20 into engagement with arms on the neck mold carrier with the result that the coil spring 19 is compressed and the neck mold sections separated a distance sufficient to release a blank or parison to the control of the finishing mold. The above patent fully illustrates these features.

The neck mold as brought out heretofore must be maintained in proper alignment with the dipping head 12 in order to prevent leakage of the vacuum and air under pressure. For this purpose adjustable connectors are provided which hold the neck mold carriers and consequently the neck molds themselves, against sagging downward away from the dipping head. The adjustable feature of these connectors permits setting of the carriers to obtain any desired clearance between the neck mold and dipping head. The construction may be stated as follows: Each connector 24 includes a vertical bar 25 the lower end of which is provided with a boss 26 having a tongue 27 fitting in a channel 28 or groove, formed in the front end of the corresponding neck mold carrier arm. Screws 29 or similar fasteners secure the bar to the neck mold carrier.

The extreme upper end of the bar may be connected to a tension rod 30 the upper end of which is secured to the dipping frame 13. This tension rod, however, may, if desired, be dispensed with since the connectors herein illustrated provide adequate support for the neck mold and are not in the least dependent upon the rods 30 in this connection.

A roller 31 is mounted upon a shaft 32 extending inwardly from the upper portion of the bar 25, said roller adapted at all times to ride upon a hardened bearing plate 33 which is fixed to the upper side of the dipping head 12 and is curved about the axis of the hinge pin 18. The shaft 32 is eccentrically mounted upon the inner end of a hub 34 which is mounted in a split bearing 35. A hexagon head 36 is provided at the outer end of hub for engagement with a wrench or other tool which may be employed in imparting rotary movement to the hub such as is necessary in raising or lowering the neck mold carrier relative to the dipping head 12. A lock screw 37 associated with the split bearing 35 functions in the usual manner to tighten the bearing about said hub and hold it against rotary movement. An oil groove 38 encircles the hub 34 and is in constant communication with an oil cup 39 by way of a conduit 40 extending through the bearing 35 as shown in Fig. 2. Obviously this feature greatly facilitates movement of the parts when adjustment is necessary.

Operation of the device simply involves loosening of the lock screw 37 and manual rotation of the hub 34 until the desired clearance between the neck mold carrier 17 and dipping head 12 is obtained. Suitable gauges are ordinarily employed in determining when such clearance is established. Thereafter the locking screw 37 will again be tightened to maintain the adjustment.

Modifications may be resorted to within the spirit and scope of the appended claims.

What I claim is:

1. In a glassware forming machine, a mold support including a dipping head, a partible neck mold, a partible body blank mold, said molds mounted upon the support for opening and closing movements relative to and in a plane below said dipping head, an auxiliary neck mold support connecting said neck mold and dipping head, said auxiliary neck mold support including an upstanding bar fixed at its lower end to the neck mold, and a roller mounted upon said bar and riding on the upper surface of the dipping head.

2. In a glassware forming machine, a mold support including a dipping head, a vertical hinge pin carried by the support, a pair of neck mold supporting arms pivoted to the hinge pin in a plane beneath the dipping head, neck mold sections on said arms, a partible blank mold supported for cooperation with the neck mold, means for alternately opening and closing the neck and body blank molds, auxiliary neck mold supports individual to the neck mold arms connecting said arms and the dipping head, said auxiliary neck mold supports each including an upstanding arm secured at its lower end to the corresponding neck mold supporting arm, and a roller on said upstanding arm riding upon the upper side of said dipping head.

3. In a glassware forming machine, a mold support including a dipping head, a vertical hinge pin carried by the support, a pair of neck mold supporting arms pivoted to the hinge pin in a plane beneath the dipping head, neck mold sections on said arms, a partible blank mold supported for cooperation with the neck mold, means for alternately opening and closing the neck and body blank molds, auxiliary neck mold supports individual to the neck mold arms connecting said arms and the dipping head, said auxiliary neck mold supports each including an upstanding arm secured at its lower end to the corresponding neck mold arm, a roller on said upstanding arm riding upon the upper side of said dipping head, an eccentric mounting for said roller, and means whereby said eccentric mounting may be adjusted to raise or lower the neck mold arms.

4. In a glassware forming machine, a dipping head, a neck mold unit arranged below said head and including a pair of neck mold supporting arms pivoted together for swinging movement in a horizontal plane, a pair of neck mold sections supported on said arms, a partible blank mold, means for opening and closing said body blank mold and moving said arms about their pivot to alternately open and close the neck mold, and arms having direct rigid connection with the free ends of the neck mold arms and riding on the dipping head while held in fixed relation to the neck mold arms, thereby supporting said first mentioned arms against independent downward movement.

5. In a glassware forming machine, a dipping head, a neck mold unit arranged below said head and including a pair of neck mold supporting arms pivoted together for swinging movement in a horizontal plane, a pair of neck mold sections supported on said arms, a partible blank mold, means for opening and closing said body blank mold and moving said arms about their pivot to alternately open and close the neck mold, an auxiliary neck mold support including upstanding arms individual to the neck mold arms and secured at their lower ends to the latter, and means providing horizontal sliding connection between the upper portions of said upstanding arms and the dipping head.

6. In a glassware forming machine, a dipping head, a neck mold unit arranged below said head and including a pair of neck mold supporting arms pivoted together for swinging movement in a horizontal plane, a pair of neck mold sections supported on said arms, a partible blank mold, means for opening and closing said body blank mold and moving said arms about their pivot to alternately open and close the neck mold, an auxiliary neck mold support including upstanding arms individual to the neck mold arms and secured at their lower ends to the latter, a roller on each upstanding arm engaging the upper side of the dipping head, and means providing an adjustable connection between said roller and arm whereby the neck mold may be raised or lowered relative to the dipping head.

7. In a glassware forming machine, a dipping head, a neck mold unit arranged below said head and including a pair of neck mold supporting arms pivoted together for swinging movement in a horizontal plane, a pair of neck mold sections supported on said arms, a partible blank mold, means for opening and closing said body blank mold and moving said arms about their pivot to alternately open and close the neck mold, a hub rotatably supported on each upstanding arm, a shaft eccentrically mounted upon said hub, a roller journaled on said shaft and engaging the upper side of the dipping head, means for rotating the hub to thereby adjust the operating position of the roller and raise or lower the neck mold, and means for locking said hub against rotation.

8. In a glassware forming machine, a mold group including a dipping head, a vertical hinge pin, a partible neck mold mounted for opening and closing movement about said hinge pin in a horizontal plane below the neck mold, a blank mold arranged for cooperation with the neck mold, an auxiliary support for the neck mold including an upstanding arm, a roller carried by the arm and riding on the upper side of the dipping head, and means providing separable connection between the neck mold and the lower end of said upstanding arm.

9. In a glassware forming machine, a mold group including a dipping head, a vertical hinge pin, a partible neck mold mounted for opening and closing movement about said hinge pin in a horizontal plane below the dipping head, a blank mold arranged for cooperation with the neck mold, an auxiliary support for the neck mold including an upstanding arm, a roller carried by the arm and riding on the upper side of the dipping head, means providing separable connection between the neck mold and the lower end of said upstanding arm, and means providing an eccentric connection between the roller and said upstanding arm whereby the operating position of the roller may be changed to raise or lower the neck mold relative to the dipping head.

10. In a glassware forming machine, a mold group including a dipping head, a partible neck mold, a partible blank mold, said molds mounted for opening and closing movement in a plane below the dipping head and about a common vertical axis, means for alternately opening and closing said molds, upstanding arms carried by the neck mold sections and extending above the upper side of the dipping head, and means at the upper end of said arms overhanging and slidingly contacting the upper side of said head.

11. In a glassware forming machine, a mold group including a dipping head, a partible neck mold, a partible blank mold, said molds mounted for opening and closing movement in a plane below the dipping head and about a common vertical axis, means for alternately opening and closing said molds, upstanding arms carried by the neck mold sections and extending above the upper side of the dipping head, and rollers at the upper ends of said arms riding on the upper side of the dipping head.

12. In a glassware forming machine, a mold support including a dipping head, a partible neck mold, a partible body blank mold, said molds mounted upon the support for opening and closing movements relative to and in a plane below said dipping head, an auxiliary neck mold support connecting said neck mold and dipping head and rigidly connected to one of said two last named parts, and means for connecting said auxiliary support to the other part for free bodily movement relative to said other part in a horizontal plane only during the opening and closing movements of said molds.

13. In a glassware forming machine, a mold support including a dipping head, a vertical hinge pin carried by the support, a pair of neck mold supporting arms pivoted to the hinge pin in a horizontal plane beneath the dipping head, neck mold sections on said arms, a partible blank mold supported for cooperation with the neck mold, means for alternately opening and closing the neck and body blank molds, auxiliary neck mold supports individual to the neck mold arms connecting said arms and the dipping head, means for rigidly connecting said auxiliary supports with the neck mold arms to move bodily therewith, and means for connecting said auxiliary supports to said dipping head for sliding movement thereon in a horizontal plane only during the opening and closing movements of the neck mold sections.

CHARLES B. SMITH.